(12) United States Patent
Varadarajan et al.

(10) Patent No.: US 9,048,918 B2
(45) Date of Patent: Jun. 2, 2015

(54) ANTENNA GROUPING AND GROUP-BASED ENHANCEMENTS FOR MIMO SYSTEMS

(71) Applicant: TEXAS INSTRUMENTS INCORPORATED, Dallas, TX (US)

(72) Inventors: Badri Varadarajan, Mountain View, CA (US); Eko N. Onggosanusi, Allen, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 14/503,108

(22) Filed: Sep. 30, 2014

(65) Prior Publication Data

US 2015/0016577 A1    Jan. 15, 2015

Related U.S. Application Data

(60) Continuation of application No. 13/104,845, filed on May 10, 2011, now Pat. No. 8,848,852, which is a division of application No. 11/851,849, filed on Sep. 7, 2007, now Pat. No. 7,961,810.

(60) Provisional application No. 60/824,870, filed on Sep. 7, 2006.

(51) Int. Cl.
*H04B 7/10* (2006.01)
*H04L 1/02* (2006.01)
(Continued)

(52) U.S. Cl.
CPC ............ *H04B 1/1027* (2013.01); *H04B 7/0417* (2013.01); *H04B 7/063* (2013.01);
(Continued)

(58) Field of Classification Search
CPC .......... H04B 1/40; H04B 3/23; H04B 1/1027; H04B 7/0417; H04B 7/063; H04B 7/0632; H04B 7/0634; H04B 7/066; H04L 27/2647; H04L 27/2332; H04L 2027/003; H04L 25/067; H04L 1/0045; H04L 1/06

USPC .................. 375/219, 316, 324, 340, 347, 375
See application file for complete search history.

(56) References Cited

U.S. PATENT DOCUMENTS

| 6,927,728 B2 | 8/2005 | Vook et al. |
| 7,142,864 B2 | 11/2006 | Laroia et al. |

(Continued)

FOREIGN PATENT DOCUMENTS

| EP | 1156596 | 11/2000 |
| WO | WO2005/125020 | 12/2005 |

(Continued)

OTHER PUBLICATIONS

Jeongkeun Choi, and Yoshihiko Akaiwa; Performance of a Base Station Feedback-Type Adaptive Array Antenna with Decision Feedback Equalizer at Mobile Station; Graduate School of Information Science and Electrical Engineering Kyushu university; 0-7803-8196-3; 2003 IEEE Topical Conference on Wireless Conimunication Technology.

(Continued)

*Primary Examiner* — Ted Wang
(74) *Attorney, Agent, or Firm* — Ronald O. Neerings; Frank D. Cimino

(57) ABSTRACT

Embodiments of the present disclosure provide a transmitter, a receiver and methods of operating a transmitter and a receiver. In one embodiment, the transmitter has at least three transmit antennas and includes a feedback decoding portion configured to recover at least one group-based channel quality indicator provided by a feedback signal from a receiver, wherein each group-based channel quality indicator corresponds to one of a set of transmission layer groupings. The transmitter also includes a modulator portion configured to generate at least one symbol stream and a mapping portion configured to multiplex each symbol stream to at least one transmission layer grouping. The transmitter further includes a pre-coder portion configured to couple the transmission layers to the transmit antennas for a transmission. The receiver includes a decoder portion which is configured to use decoded signals from at least one group to decode the other groups.

16 Claims, 4 Drawing Sheets

(51) Int. Cl.
 H04B 1/10   (2006.01)
 H04B 7/04   (2006.01)
 H04B 7/06   (2006.01)
 H04L 27/26  (2006.01)

(52) U.S. Cl.
 CPC .......... *H04B 7/0632* (2013.01); *H04B 7/0634* (2013.01); *H04B 7/0639* (2013.01); *H04B 7/066* (2013.01); *H04B 7/0697* (2013.01); *H04L 27/2601* (2013.01); *H04B 7/0478* (2013.01)

(56) References Cited

U.S. PATENT DOCUMENTS

| | | | |
|---|---|---|---|
| 7,181,246 | B2 | 2/2007 | Lo |
| 7,636,573 | B2 | 12/2009 | Walton et al. |
| 7,649,831 | B2 | 1/2010 | Van Rensburg et al. |
| 7,660,607 | B2 * | 2/2010 | Oh et al. ................ 455/562.1 |
| 7,961,810 | B2 * | 6/2011 | Varadarajan et al. ........ 375/295 |
| 8,848,852 | B2 | 9/2014 | Varadarajan et al. |
| 2003/0148770 | A1 | 8/2003 | Das et al. |
| 2004/0131038 | A1 | 7/2004 | Kim et al. |
| 2005/0111376 | A1 | 5/2005 | Raghothaman et al. |
| 2005/0128993 | A1 | 6/2005 | Yu et al. |
| 2005/0195912 | A1 | 9/2005 | Kim et al. |
| 2006/0039328 | A1 | 2/2006 | Ihm et al. |
| 2006/0079221 | A1 | 4/2006 | Grant et al. |
| 2006/0093061 | A1 | 5/2006 | Chae et al. |
| 2006/0098568 | A1 | 5/2006 | Oh et al. |
| 2006/0098754 | A1 | 5/2006 | Kim et al. |
| 2006/0209923 | A1 | 9/2006 | Jin et al. |
| 2006/0250941 | A1 | 11/2006 | Onggosanusi et al. |
| 2006/0276212 | A1 | 12/2006 | Sampath et al. |

FOREIGN PATENT DOCUMENTS

| | | |
|---|---|---|
| WO | WO2006006770 | 1/2006 |
| WO | WO2006008622 | 1/2006 |
| WO | WO2006062994 | 6/2006 |

OTHER PUBLICATIONS

Seyeong Choi, Student Member, IEEE, Young-Chai Ko, Member, IEEE, and Edward J. Powers, Fellow, IEEE; Optimization of Switched MIMO Systems Over Rayleigh Fading Channels; I0018-9545; EEE Transactions on Vehicular Technology, vol. 56, No. 1, Jan. 2007.

Zhengwei Gong, Taiyi Zhang and Ruiping Zhang; School of Electronics and Information Engineering; A New Rate 3/4 Transmit Diversity for Five and Six Transmit Antennas with Phase Feedback; 1-4244-0517-3/06; 2006 IEEE.

Syed Ali Jafar and Andrea Goldsmith; On Optimality of Beamforming for Multiple Antenna Systems with Imperfect Feedback; Department of Electrical Engineering Stanford University; 1-7803-7123-2; ISIT2001, Washington, DC, Jun. 24-29, 2001.

Byoung-Hoon Kim, Tamer Kadous, Durga Malladi, Sandip Sarkar, Xiaoxia Zhang, and Josef Blanz; Selective Virtual Antenna Permutation for Layered OFDM-MIMO Transmission; 1-4244-0357-X; 2006 IEEE.

Marios Kountouris, Ruben de Francisco, David Gesbert, Dirk T. M. Slock and Thomas Salzer; Multiuser Diversity—Multiplexing Tradeoff in MIMO Broadcast Channels with Limited Feedback; France Telecom Research and Development, Issy-les-Moulineaux; 1424407850/06.

Lucent Technologies; MIMO system integration and signalling in HSDPA; 3GPP TSG RAN WG1; TSGR1#19(01)0305.

Hung-Ta Pai; Limited Feedback for Antenna Selection in MIMO-OFDM Systems; Graduate Institute of Communication Engineering National Taipei University; 1-4244-0086-4/05; IEEE CCNC 2006.

Pooya Shariatpanahi, Behtash Babadi, Babak Hossein Khalaj; Department of Electrical Engineering Sharif University of Technology; Feedback Bit Reduction for Antenna Selection Methods in Wireless Systems; 1-4244-0000-7/05; 2005 IEEE.

Taiwen Tang, Robert W. Heath, Jr. Sunghyun Cho, and Sangboh Yun; Opportunistic Feedback and Online Optimization for Multiuser MIMO Systems with Linear Receivers; Department of Electrical & Computer Engineering the University of Texas at Austin; 1-4244-0785-0/06.

Hyunseok Yu, Hyun Seok Oh, Hye-Jeong Lee, Yong Suk Moon and Ginkyu Choi; Transmit Selection Diversity Technique in the MIMO-OFDM Systems for HSDPA; Samsung Electronics Co., LTD; 7803-8255-2/04.

Rui Zhang and John M. Cioffi; Ying-Chang Liang; Approaching MIMO-OFDM Capacity with Per Antenna Power and Rate Feedback; Department of Electrical Engineering, Stanford University; Institute for Infocomm Research, Singapore; 1-4244-0355-3/06; 2006 IEEE.

Hangjun Chen and Alexander M. Haimovich; Layered MIMO Scheme with Antenna Grouping; Jul. 26, 2004.

International Search Report; PCTUS07778941; Sep. 7, 2007.

* cited by examiner

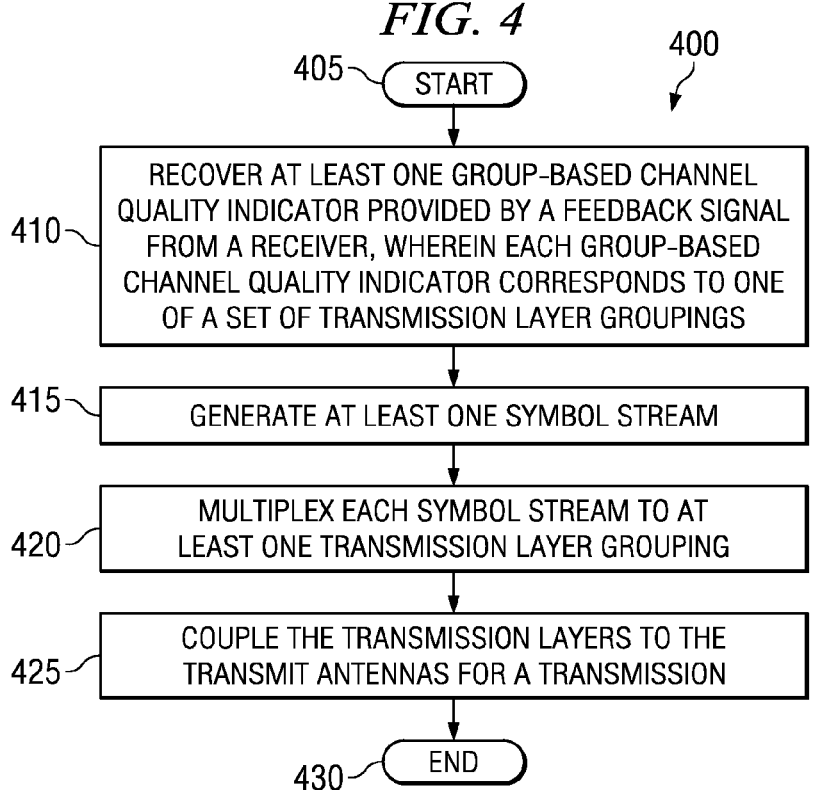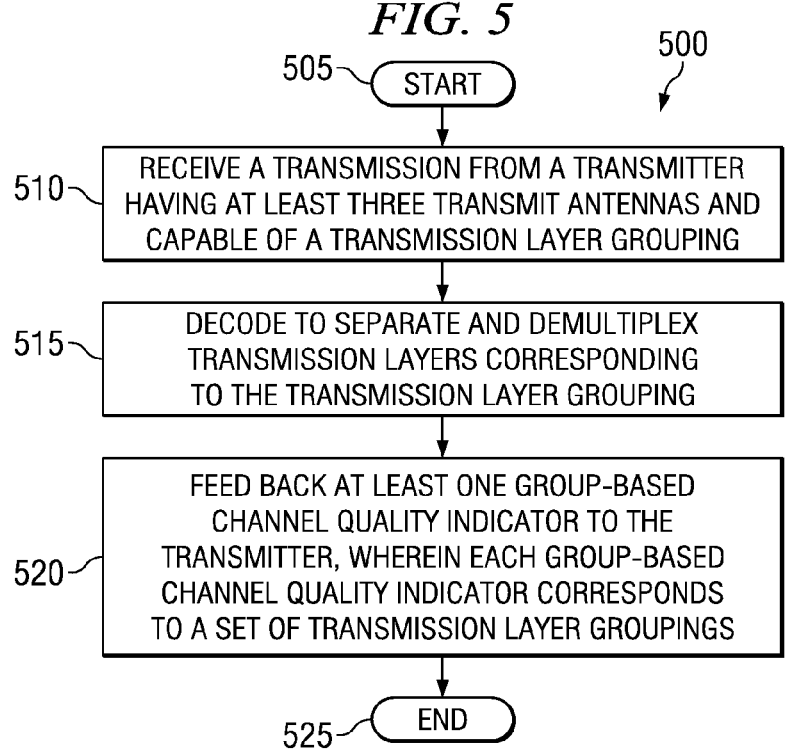

ANTENNA GROUPING AND GROUP-BASED ENHANCEMENTS FOR MIMO SYSTEMS

CROSS-REFERENCE TO PROVISIONAL APPLICATIONS

This application is a Continuation of application Ser. No. 13/104,845 filed May 10, 2011, which is a Divisional of application Ser. No. 11/851,849 filed Sep. 7, 2007, now U.S. Pat. No. 7,961,810, which claims the benefit of U.S. Provisional Application No. 60/824,870 entitled "Antenna Grouping and Related Enhancements for MIMO Systems" to Badri Varadarajan and Eko N. Onggosanusi, filed on Sep. 7, 2006, which is incorporated herein by reference in its entirety.

Additionally, this application claims the benefit of U.S. Provisional Application No. 60/827,973 entitled "Codebook Design for Per-Group Rate Control" to Eko N. Onggosanusi and Badri Varadarajan, filed on Oct. 3, 2006, which is incorporated herein by reference in its entirety.

Further, this application claims the benefit of U.S. Provisional Application No. 60/891,074 entitled "Grouping-Based Codebook design for Per-Group Rate Control" to Eko N. Onggosanusi and Badri Varadarajan, filed on Feb. 22, 2007, which is incorporated herein by reference in its entirety.

TECHNICAL FIELD

The present disclosure is directed, in general, to wireless communication systems and, more specifically, to Multiple-Input Multiple-Output (MIMO) communication employing a transmitter, a receiver and methods of operating a transmitter and a receiver.

BACKGROUND

Multiple-input multiple-output (MIMO) communication systems offer large increases in throughput due to their ability to support multiple parallel data streams that are each transmitted from different antennas. In the most general form, MIMO transmissions employ a number of parallel spatial streams that are independently FEC encoded. Each stream is then mapped to one or more spatial transmission layers. Mapping to multiple antennas can be done by introducing a linear transformation from the transmission layers to the physical antennas. The number of spatial transmission layers is called the rank of transmission, and the layers are mapped to the real transmit antennas. This mapping is typically accomplished by linearly combining the layer signals to obtain the actual transmit signals. This operation is also termed pre-coding. Although current MIMO communications offer advantages over single antenna systems, further improvements would prove beneficial in the art.

SUMMARY

Embodiments of the present disclosure provide a transmitter, a receiver and methods of operating a transmitter and a receiver. In one embodiment, the transmitter has at least three transmit antennas and includes a feedback decoding portion configured to recover at least one group-based channel quality indicator provided by a feedback signal from a receiver, wherein each group-based channel quality indicator corresponds to one of a set of transmission layer groupings. The transmitter also includes a modulator portion configured to generate at least one symbol stream and a mapping portion configured to multiplex each symbol stream to at least one transmission layer grouping. The transmitter further includes a pre-coder portion configured to couple the transmission layers to the transmit antennas.

In another embodiment, the receiver includes a receive portion employing a transmission from a transmitter having at least three transmit antennas and capable of a transmission layer grouping and a stream decoder portion configured to separate and demultiplex transmission layers corresponding to the transmission layer grouping. The receiver also includes a feedback generator portion configured to provide at least one group-based channel quality indicator that is fed back to the transmitter, wherein each group-based channel quality indicator corresponds to one of a set of transmission layer groupings.

In another aspect, the present disclosure provides a method of operating a transmitter. The transmitter has at least three transmit antennas, and the method includes recovering at least one group-based channel quality indicator provided by a feedback signal from a receiver, wherein each group-based channel quality indicator corresponds to one of a set of transmission layer groupings. The method also includes generating at least one symbol stream, multiplexing each symbol stream to at least one transmission layer grouping, and coupling the transmission layers to the transmit antennas.

In yet another aspect, the present disclosure provides a method of operating a receiver. The method includes receiving a transmission from a transmitter having at least three transmit antennas and capable of a transmission layer grouping and decoding to separate and demultiplex transmission layers corresponding to the transmission layer grouping. The method also includes feeding back at least one group-based channel quality indicator to the transmitter, wherein each group-based channel quality indicator corresponds to one of a set of transmission layer groupings.

The foregoing has outlined preferred and alternative features of the present disclosure so that those skilled in the art may better understand the detailed description of the disclosure that follows. Additional features of the disclosure will be described hereinafter that form the subject of the claims of the disclosure. Those skilled in the art will appreciate that they can readily use the disclosed conception and specific embodiment as a basis for designing or modifying other structures for carrying out the same purposes of the present disclosure.

BRIEF DESCRIPTION OF THE DRAWINGS

For a more complete understanding of the present disclosure, reference is now made to the following descriptions taken in conjunction with the accompanying drawings, in which:

FIG. 4 illustrates an embodiment of a method of operating a transmitter; and FIG. 5 illustrates an embodiment of a method of operating a receiver.

DETAILED DESCRIPTION

Embodiments of the present disclosure presented below employ a transmitter and a receiver equipped with multiple antennas. The receiver may feed back a channel quality indicator (CQI) report to assist the transmitter in selecting transmission parameters. Specifically, the transmission chooses the transmission rank, i.e., the number of active spatial transmission layers to be transmitted; and the manner in which data is encoded on these antennas.

In general, larger transmission ranks allow more spatial streams or a higher data rate per stream to be transmitted per unit of time. The number of spatial streams can be as high as the transmission rank itself. However, the feedback and signaling overhead tend to increase with the number of spatial streams. To reduce feedback, it is desirable to reduce the number of spatial streams while maintaining the same rank. This can be done by assigning a group of multiple transmission layers to one spatial stream. In particular, this disclosure addresses such stream-to-layer mapping for rank-3 and rank-4 transmission.

In addition to rank, the transmitter also chooses the modulation and coding scheme for each spatially encoded stream. This could be done using the channel quality indicator report from the receiver. The channel quality indicator report may be one of or a combination of various feedback quantities such as (but not limited to) the signal-to-interference plus noise ratio (SINR), preferred data rate or modulation-coding scheme, capacity-based or other mutual information or received signal power. Further, the CQI report may be layer-based or group based. In the former case the CQI quantity (SINR, modulation-coding scheme, etc) are fed back per layer. Alternatively in group-based CQI reporting, the preferred antenna grouping and the corresponding CQI are fed back. Clearly, the group-based CQI depends strongly on the MIMO decoder that is used to separate the transmitted data streams. One possible scheme is the group successive interference cancellation (G-SIC) MIMO decoder, which offers high throughput with low latency and easy link adaptation. The G-SIC decoder decodes one spatial stream at a time while removing the contribution of the previously decoded streams from the received signal.

In either case, the transmitter utilizes the receiver feedback to determine the number of parallel spatial streams to be transmitted to the receiver.

The mapping from transmission layers to physical antennas called pre-coding, may be adapted to induce a certain set of properties to the effective channel across transmission layers. For instance, the effective channel may be made more uncorrelated. In general, pre-coding aims to increase the system throughput. Precoding may be based on receiver feedback, or it can be done in a feedback-independent manner, by using a time-varying pre-coding pattern when non-trivial grouping is done.

Figure 1:
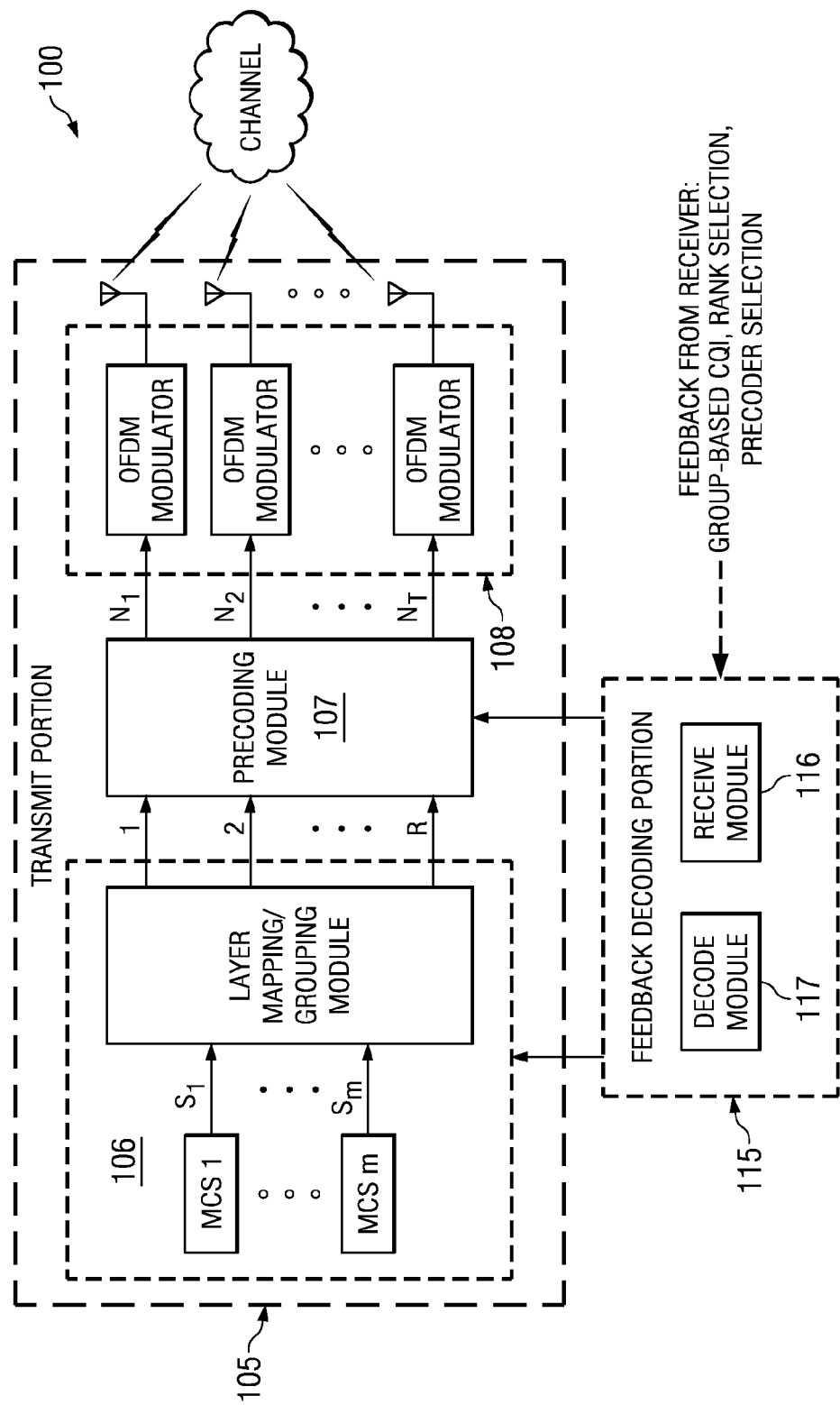
FIG. 1 illustrates a system diagram of a transmitter as provided by one embodiment of the present disclosure.

FIG. 1 illustrates a system diagram of a transmitter 100 as provided by one embodiment of the present disclosure. In the illustrated embodiment, the transmitter 100 operates in an OFDM communication system although the principles of the present disclosure may be employed in other communication systems. The transmitter 100 includes a transmit portion 105 and a feedback decoding portion 115. The transmit portion 105 includes a layer mapping/grouping module 106, a pre-coding module 107 and an OFDM module 108 having multiple OFDM modulators that feed the corresponding transmit antennas. The feedback decoding portion 115 includes a receive module 116 and a decode module 117.

The transmitter 100 has at least three transmit antennas and is capable of transmitting at least one spatial stream corresponding to a transmission layer grouping. The feedback decoding portion 115 is configured to recover at least one group-based CQI provided by a feedback signal from a receiver wherein the group-based CQI corresponds to one of a set of transmission layer groupings. The transmit portion 105 is coupled to the multiple transmit antennas and provides a transmission based on the transmission layer groupings.

Grouping is done by mapping one spatial stream to multiple transmission layers wherein the number of active transmission layers is given by a transmission rank R. Embodiments of the present disclosure include groupings for transmission ranks of three and four. However the principles of the present disclosure apply to higher transmission ranks and therefore larger number of physical antennas, as well.

For a rank three transmission, two transmission grouping configurations are possible. These include one group of three transmission layers and two groups of one and two transmission layers, respectively. The one group case provides an advantage that only one CQI needs to be fed back to the transmitter. A disadvantage is the loss of link adaptation flexibility, and the fact that this grouping cannot exploit the G-SIC decoder, as mentioned above. Two groups may be advantageously employed in that their use offers a compromise between feedback requirement and link adaptation performance. There are multiple options on how the two groups may be specified. For example, there are three possible selections for the two group case, depending on which transmission layer is used separately (that is, $\{1, (2,3)\}$, $\{2, (1,3)\}$, $\{3, \{1,2\}\}$). This may be considered an optimized grouping wherein the receiver can feed back information regarding the separately chosen transmission layer. That is, the receiver can feed back the index of the transmission layer that is not grouped with another transmission layer. Alternatively, a fixed grouping may be employed wherein one of the three selections is assumed to be a default. For instance, it might be assumed that transmission layers two and three are always grouped together.

For a rank four transmission, two transmission grouping configurations are possible. These include one group of four transmission layers and a two group case involving an asymmetrical grouping of one and three transmission layers, respectively. For the two group case, it is possible to either assume a fixed grouping or feed back an optimum grouping, as before.

A combination of grouping strategies may be considered wherein the receiver feeds back the transmission layer groupings and corresponding group-based CQIs for a set of transmission ranks. In a preferred embodiment, the set of transmission layer groupings may be only the optimum rank, which is determined by the receiver using some criterion like sum throughput. Alternatively, the transmission layer groupings may be all ranks associated with the possible groups for the number of transmit antennas. Additionally, any other combination between these two may be employed.

As an example, for a rank three transmission and a preferred grouping of two groups, two group-based CQIs, antenna indices and a grouping index are fed back to the transmitter 100. For a rank four transmission and a preferred grouping of either two symmetrical or two asymmetrical groups, two group-based CQIs, antenna indices and a grouping index are also feed back to the transmitter 100.

The pre-coding module 107 provides group permutation of spatial data streams associated with the transmission layer grouping provided by the grouping module 106. Precoding consists of a mapping between the R transmission layers and the $N_T$ physical antennas. Embodiments of the pre-coders presented are linear. That is, the signal on each of the physical antennas is some linear combination of the signals on the transmission layers. Thus the mapping can be specified by an $N_T \times R$ linear pre-coding matrix. The following options exist for the pre-coding matrix.

One such example is antenna selection, where each of the R transmission layers is mapped to a physical antenna. This amounts to a pre-coding matrix obtained by picking R columns out of the $N_T \times N_T$ identity matrix.

A group-based pre-coder, where more than two antennas are employed, may be chosen from a fixed codebook of possible pre-coding matrices. The receiver then feeds back the index of the matrix to be used. Alternatively, a layer permutation may also be used where the pre-coding proceeds in a two-stage manner. In stage one, the signal out of the transmission layers is permuted in a time-varying manner. For instance, in time k, the transmission layer signals may be cyclically shifted by k positions. In the second stage, the output of the permuted transmission layers is pre-coded by a pre-coding matrix. Group-based pre-coding may also employ group permutation and pre-coder-hopping.

Group permutation may be applied to the case of a rank four transmission, with two groups of two antennas each. It is an extension of layer permutation, the permutation preserves the grouping of the antennas. In other words, the permutation is done independently between the first and second antennas of each group. Thus, if the antenna grouping is (1,4) and (2,3), then the transmission layers are permuted as follows in every even time instant, 1→2, 2→1, 3→4, 4→3.

Pre-coder hopping is a generalization of layer permutation. Here, instead or just letting the layer permutation vary from time to time, the pre-coder matrix itself is allowed to vary from time to time in a known manner. The pre-coder can vary over a subset of the codebook of allowed pre-coding matrices. The subset can optionally be chosen by receiver feedback.

Embodiments of transmission layer grouping and group-based pre-coding may be employed to achieve near-optimum throughput with low feedback using transmission layer grouping pre-coder enhancement and enhanced decoders. In summary, advantages include grouping all three antennas together or using two groups having one and two antennas, respectively, for a transmission of rank three. For the case of two groups, the grouping of the antennas may be explicitly chosen among the three possibilities, or a default grouping may be used. Precoding may employ group permutation wherein the groups are permuted in a periodic manner before pre-coding by a time-invariant matrix. Time-variant pre-coding may be employed, which includes pre-coding matrix varies from time to time over a subset of a codebook of allowed matrices. The subset can be either fixed, or chosen by receiver feedback.

Figure 2A:
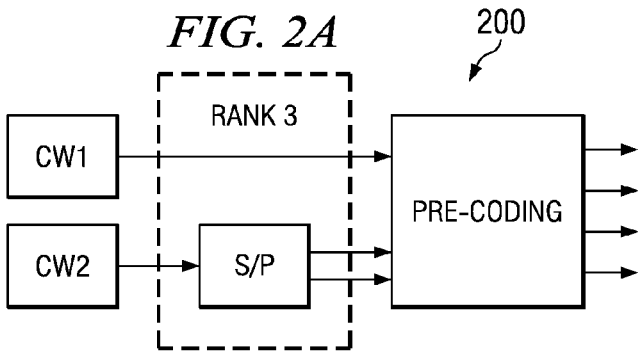
FIGS. 2A-2C illustrate diagrams of several transmitter configurations as provided by embodiments of the disclosure.
Figure 2B:
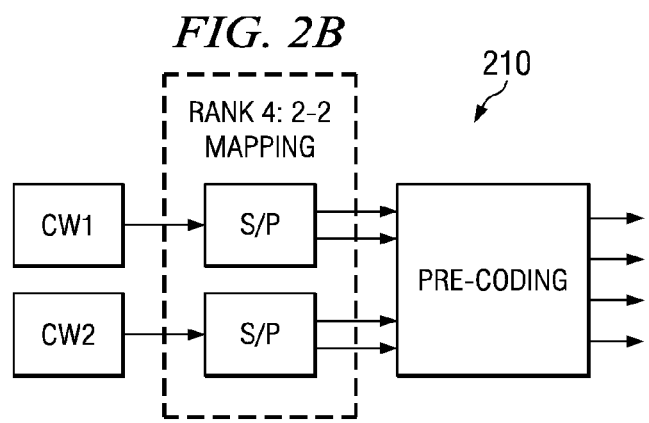
Figure 2C:
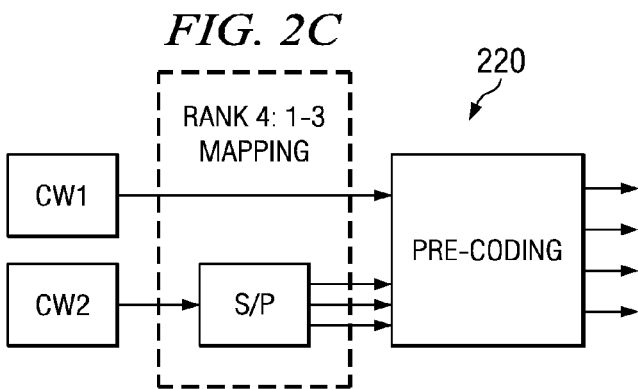

FIGS. 2A-2C illustrate diagrams of several transmitter configurations 200-220 as provided by embodiments of the disclosure. Per group rate control (PGRC), as depicted in FIGS. 2A-2C is an efficient four-layer, two-stream transmission scheme that achieves the performance of four-stream transmission (per antenna rate control (PARC)) while reducing the total uplink (UL) and downlink (DL) overhead. Any pre-coding scheme may be applied with PGRC as depicted in FIGS. 2A-2C. In particular, any codebook may be used in conjunction with PGRC. The illustrated embodiments of FIGS. 2A-2C address simple codebook-based pre-coding design based on layer grouping, and the codebook design in relation to HARQ and rank override flexibility.

One possible codebook for PGRC may be constructed based on antenna grouping. For a given channel realization, the grouping may be chosen based on a certain optimality criterion (e.g., maximum SINR, maximum throughput, etc.). Alternatively, the grouping can be based on long-term channel statistics and therefore is adapted at a slower rate.

For rank three transmission of FIG. 2A, the grouping can be represented as a size-12 codebook. Instead of the codebook matrix representation, we express rank three grouping in terms of the antenna index combination in equation (1).

$$\Gamma^{1+2} \in \left\{ \begin{matrix} (1,2,3), (1,2,4), (1,3,4), (2,1,3), (2,1,4), (2,3,4), \\ (3,1,2), (3,1,4), (3,2,4), (4,1,2), (4,1,3), (4,2,3) \end{matrix} \right\} \quad (1)$$

For example, the (1,2,4) and (2,1,3) groupings can be expressed as the following 4×3 matrices, respectively, in equation (2).

$$\begin{bmatrix} 1 & 0 & 0 \\ 0 & 1 & 0 \\ 0 & 0 & 0 \\ 0 & 0 & 1 \end{bmatrix}, \begin{bmatrix} 0 & 1 & 0 \\ 1 & 0 & 0 \\ 0 & 0 & 1 \\ 0 & 0 & 0 \end{bmatrix} \quad (2)$$

For the rank four transmission of FIG. 2B (2+2 mapping pattern), the antenna grouping codebook can be described in equation (3) as a size-3 codebook:

$$\Gamma^{2+2} \in \left\{ \begin{bmatrix} 1 & 0 & 0 & 0 \\ 0 & 1 & 0 & 0 \\ 0 & 0 & 1 & 0 \\ 0 & 0 & 0 & 1 \end{bmatrix}, \begin{bmatrix} 1 & 0 & 0 & 0 \\ 0 & 0 & 1 & 0 \\ 0 & 1 & 0 & 0 \\ 0 & 0 & 0 & 1 \end{bmatrix}, \begin{bmatrix} 1 & 0 & 0 & 0 \\ 0 & 0 & 0 & 1 \\ 0 & 1 & 0 & 0 \\ 0 & 0 & 1 & 0 \end{bmatrix} \right\} \quad (3)$$

Alternatively, when frequency selective pre-coding is applied (different pre-codings can be applied to different groups of sub-carriers, which is termed the pre-coding sub-band), introducing ordering across different data streams is beneficial. One way to capture this is by expanding the codebook in equation (3) to a size-6 codebook as shown in equation (4) below.

$$\Gamma_O^{2+2} \in \left\{ \begin{bmatrix} 1 & 0 & 0 & 0 \\ 0 & 1 & 0 & 0 \\ 0 & 0 & 1 & 0 \\ 0 & 0 & 0 & 1 \end{bmatrix}, \begin{bmatrix} 1 & 0 & 0 & 0 \\ 0 & 0 & 1 & 0 \\ 0 & 1 & 0 & 0 \\ 0 & 0 & 0 & 1 \end{bmatrix}, \begin{bmatrix} 1 & 0 & 0 & 0 \\ 0 & 0 & 0 & 1 \\ 0 & 1 & 0 & 0 \\ 0 & 0 & 1 & 0 \end{bmatrix}, \begin{bmatrix} 0 & 0 & 1 & 0 \\ 0 & 0 & 0 & 1 \\ 1 & 0 & 0 & 0 \\ 0 & 1 & 0 & 0 \end{bmatrix}, \begin{bmatrix} 0 & 1 & 0 & 0 \\ 0 & 0 & 0 & 1 \\ 1 & 0 & 0 & 0 \\ 0 & 0 & 1 & 0 \end{bmatrix}, \begin{bmatrix} 0 & 1 & 0 & 0 \\ 0 & 0 & 1 & 0 \\ 1 & 0 & 0 & 0 \\ 0 & 0 & 0 & 1 \end{bmatrix} \right\} \quad (4)$$

Instead of incorporating the spatial stream ordering into the codebook, it is also possible to infer the ordering from the CQI feedback (i.e., the relative magnitude of CQI-1 and CQI-2 where CQI-n denotes the CQI for spatial stream n). The transmitter selects the spatial stream for ordering for each pre-coding sub-band and signals the chosen ordering via the shared control channel. Although this approach is more efficient in terms of the UL and DL overhead (the codebook size is two times smaller while the DL overhead remains the same), it limits the receiver flexibility in performing G-SIC detection ordering. This limitation does not apply when the grouping codebook is expanded as shown in equation (2).

For the rank four transmission of FIG. 2C (1+3 mapping pattern), ordering across spatial streams may not apply due to the asymmetry. For better performance, the first spatial stream (associated with one layer) needs to be decoded first. In addition, the CQI feedback is defined per spatial stream. Hence, the grouping codebook for 1+3 mapping (size-4) may be seen in equation (3).

$$\Gamma_O^{1+3} \in \left\{ \begin{bmatrix} 1 & 0 & 0 & 0 \\ 0 & 1 & 0 & 0 \\ 0 & 0 & 1 & 0 \\ 0 & 0 & 0 & 1 \end{bmatrix}, \begin{bmatrix} 0 & 1 & 0 & 0 \\ 1 & 0 & 0 & 0 \\ 0 & 0 & 1 & 0 \\ 0 & 0 & 0 & 1 \end{bmatrix}, \begin{bmatrix} 0 & 0 & 1 & 0 \\ 1 & 0 & 0 & 0 \\ 0 & 1 & 0 & 0 \\ 0 & 0 & 0 & 1 \end{bmatrix}, \begin{bmatrix} 0 & 0 & 0 & 1 \\ 1 & 0 & 0 & 0 \\ 0 & 1 & 0 & 0 \\ 0 & 0 & 1 & 0 \end{bmatrix} \right\} \quad (5)$$

Similar to 1+3 mapping for rank four transmissions, due to the asymmetry of 1+2 mapping for rank three, ordering across spatial streams may not be applicable. Furthermore, it is also possible to select a subset of the above codebooks to reduce the codebook size As an example, an extended codebook construction based on grouping may be seen in equation (6).

$$CB = \bigcup_{n=1}^{N} f_n(\Gamma) \qquad (6)$$

$$f_n(\Gamma) = \{A_n G_i, G_i \in \Gamma\}$$

$A_n$ is a 4×4 matrix that provides a basis for the grouping codebook $\Gamma$ ($\Gamma$ could be the for 1+2 mapping, 1+3 mapping, 2+2 mapping without spatial stream ordering, or 2+2 mapping with spatial stream ordering given in equations (1)-(4)). Essentially, it multiplies each of the grouping matrices in $\Gamma$. Hence, the grouping operation is performed in a set of transformed domains. Another term that is used to represent transform domain is layer domain. In general, $A_n$ may be unitary or non-unitary, although a unitary transformation may be more natural.

An example for N=3 is to choose $(A_1, A_2, A_3)$ to be 4×4 identify matrix, a 4×4 Walsh-Hadamard matrix, and a 4×4 DFT matrix, respectively. Some other examples include 4×4. Given rotation matrices and 4×4 Householder (reflection) matrices.

While the codebook construction in equation (6) encompasses a wide range of transformed (layer) domains and hence different types of deployment/channel scenarios, the total codebook size (including all the transmission ranks) may become prohibitively large. To prevent this from happening, it is beneficial to choose the same codebook size $|\Gamma|$ while adapting the layer domain matrix $A_n$ semi-statically (long-term adaptation). That is:

$$CB_n = \{A_N G_i, G_i \in \Gamma\} \qquad (7)$$

The receiver can signal a low rate feedback to request for the change in $A_n$. The signaling may be performed in layer L1 or even higher layers (L2 or L3). Then the transmitter responds to the request from the receiver accordingly. The chance in $A_n$ is later signaled by the transmitter to the receiver via a low rate downlink signaling (physical layer or even higher layers).

The slow adaptation is initiated by the transmitter without the request from the receiver. In this case, the decision to change $A_n$ is based only on some measurements from the transmitter. Similarly, the change in $A_n$ is later signaled by the transmitter to the receiver via a low rate downlink signaling (layer L1 or even higher layers). Note that while this codebook is designed for PGRC, it also applies to any other 4×4 transmission scheme such as PARC or single-stream VBLAST. It also applies to either single-user or multi-user MIMO.

The grouping-based codebook $\Gamma$ for all the transmission ranks based on the transmission schemes depicted in FIG. 2A-2C (assuming 2+2 mapping pattern) are shown below. To streamline the description, the codebook is represented showing the antenna index combination. The codebook construction is given in Tables 1 and 2 for the cases with and without spatial stream ordering, respectively.

TABLE 1

Grouping codebook $\Gamma$ without spatial stream ordering

| Rank | Codebook | Size |
|---|---|---|
| 3 | (1,2,3),(1,2,4),(1,3,4),(2,1,3),(2,1,4),(2,3,4),<br>(3,1,2),(3,1,4),(3,2,4),(4,1,2),(4,1,3),(4,2,3) | 12 |
| 4 | (1,2,3,4),(1,3,2,4),(1,4,2,3) | 3 |

TABLE 2

Grouping codebook $\Gamma$ without spatial stream ordering

| Rank | Codebook | Size |
|---|---|---|
| 3 | (1,2,3),(1,2,4),(1,3,4),(2,1,3),(2,1,4),(2,3,4),<br>(3,1,2),(3,1,4),(3,2,4),(4,1,2),(4,1,3),(4,2,3) | 12 |
| 4 | (1,2,3,4),(1,3,2,4),(1,4,2,3),(3,4,1,2),(2,4,1,3),(2,3,1,4) | 6 |

For the construction given in Tables 1 and 2, $A_n$ is applied as described either to construct an expanded codebook or to perform grouping in single or multiple (semi-statically adapted) layer domains. Furthermore, it is also possible to select a subset of the above codebooks to reduce the codebook size. This holds for each of the transmission ranks. Also a grouping codebook construction may be obtained by choosing the codebooks in Table 1 for a set of ranks, and in Table 2 for the other ranks. From Tables 1 and 2, a lower rank precoding matrix is always a subset of a higher rank pre-coding matrix. That is, a nested property is preserved in this codebook construction.

The advantages of this codebook construction may be summarized as follows. The construction is simple and flexible with an expandable design. The grouping operation may be performed in any transform (layer) domain. The nested design (across transmission ranks) allows efficient pre-coder override when the transmission rank selected by the transmitter is lower than the receiver recommended rank (e.g., when the available data for the receiver is less than the sustainable data rate for the receiver.) In this case, the transmitter simply chooses a matrix subset of rank-ρ the recommended pre-coding matrix corresponding to the higher rank R (recommended by the receiver).

The flexibility given in the grouping codebook makes it possible to reduce the CQI inaccuracy upon rank override. For example, consider the following scenario. The receiver recommends rank four and (1,2,3,4) grouping to the transmitter and a G-SIC receiver is used (CW1 in detected first). In this case, CQI-1 (for CW1 associated with layer 1 and 2) and CQI-2 (for CW2 associated with layer 3 and 4) are fed back to the transmitter. CQI-2 assumes that the interference from CW1 has been removed by the G-SIC operation.

For some reason, the transmitter decides to override the rank-four recommendation with rank-three. In this case, (1,3,4) and (2,3,4) grouping is a better choice since CQI-2 (assuming rank four transmission) represents an accurate G-SIR/quality metric for CW2 upon rank three override. Having the flexibility given in Table 1 or 2 is clearly beneficial from this perspective.

When employing a hybrid ARQ (HARQ) operation, the following may occur. With incremental redundancy, it is possible to perform rank override. In this case, the scenario given above is also relevant. For very low mobility (or even a nomadic/semi-stationary scenario), it is beneficial to vary the pre-coding matrix depending on the channel variation. Different grouping can be optimal upon retransmissions.

For moderate mobility where time diversity is limited but pre-coding feedback becomes unreliable, varying the pre-coding matrix (which in this case corresponds to grouping) is also beneficial. Note that these advantages are valid for any codebook-based scheme having a nested property.

Figure 3:
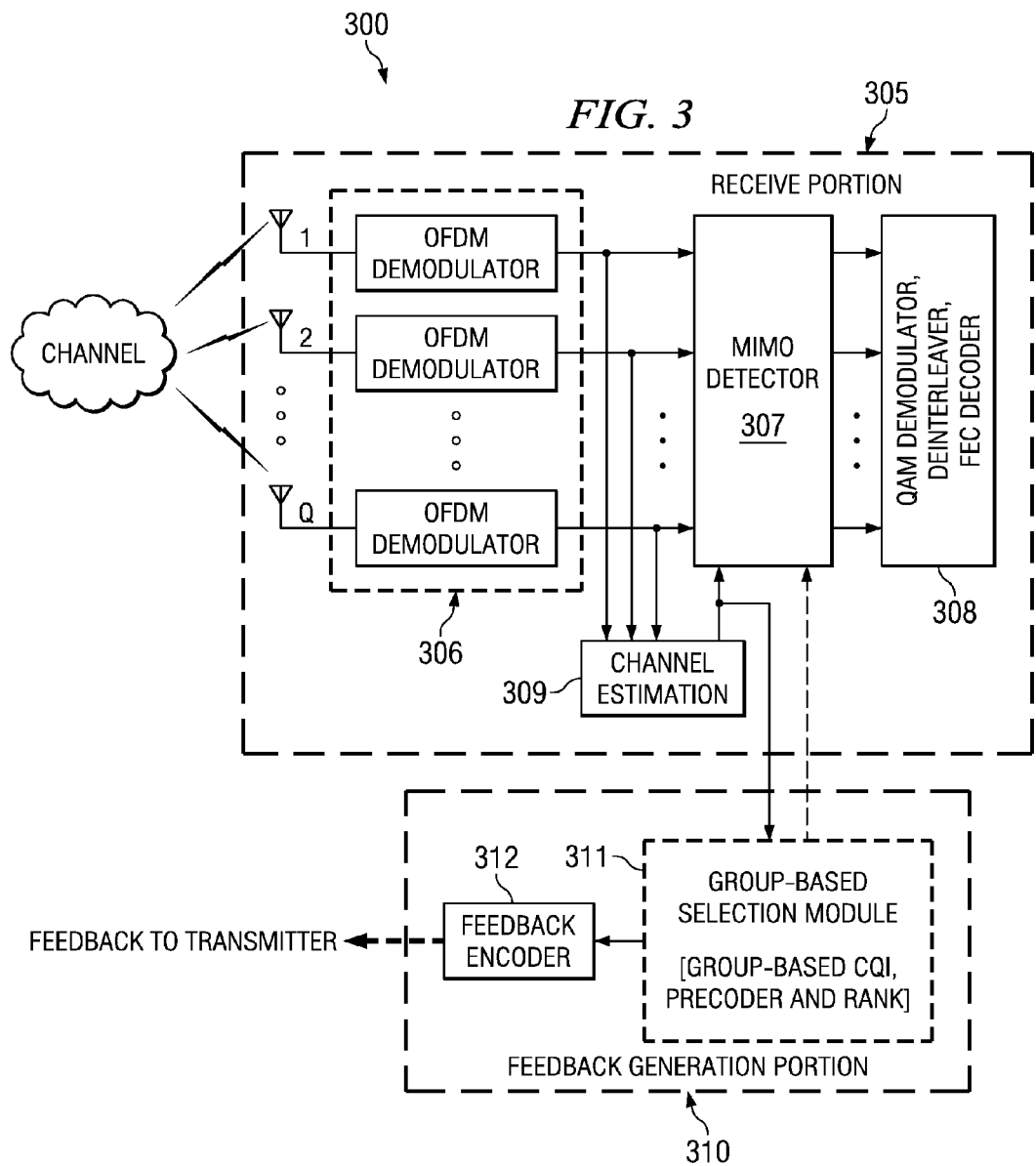
FIG. 3 illustrates a system diagram of a receiver as provided by one embodiment of the present disclosure.

FIG. 3 illustrates a system diagram of a receiver 300 as provided by one embodiment of the present disclosure. In the illustrated embodiment, the receiver 300 operates in an OFDM communications system as part of a receiver. The receiver 300 includes a receive portion 305 and a feedback generation portion 310. The receive portion 305 includes an OFDM module 306 having Q OFDM demodulators (Q is at least one) coupled to corresponding receive antenna(s), a MIMO detector 307, a QAM demodulator plus de-interleaver plus FEC decoding module 308 and a channel estimation module 309. The feedback generation port 310 includes a group-based selection module 311 and a feedback encoder 312.

In the receiver 300, the receive portion 305 employs transmission signals from a transmitter having at least three transmit antennas that is capable of transmitting at least one spatial stream and adapting a transmission layer grouping. Additionally, the feedback generation portion 310 is configured to provide at least one group-based channel quality indicator (G-CQI) that is fed back to the transmitter, wherein each G-CQI corresponds to one of a set of transmission layer groupings.

The receive portion 305 is primarily employed to receive data from the transmitter based on a pre-coding selection that was determined by the receiver and feedback to the transmitter. The OFDM module 306 demodulates the received data signals and provides them to the MIMO detector 307, which employs channel estimation and pre-coder information to further provide the received data the module 308 for further processing (namely QAM demodulation, de-interleaving, and FEC decoding). The channel estimation module 309 employs previously transmitted channel estimation signals to provide the channel estimates need by the receiver 300.

The feedback generation portion 310 determines the information to be fed back to the transmitter. For each possible transmission layer grouping, the group-based selection module 311 determines the G-CQI and group-based pre-coder feedback. This module uses the channel and noise-variance/interference estimates computed by the receiver. Rank selection then makes a choice of the set of ranks for which the information needs to be fed back. The feedback encoder 112 then encodes the pre-coder selection and the G-CQI information and feeds it back to the transmitter.

The module 308 provides an advanced decoder for groups of size greater that one transmission layer. G-CQI feedback techniques compatible with these antenna grouping are also presented.

One method of approaching MIMO channel capacity is to use the G-SIC structure, where decoding is done in stages. In the first state of decoding, signals transmitted from one transmission layer are decoded, after nulling out interference from other transmission layers using a MIMO decoder. A typical MIMO decoder used is the LMMSE decoder. The output is then re-encoded and used to cancel out spatial interference to subsequent transmission layers. Then the second transmission layer is decoded and used for further cancellation, and so on.

G-SIC is employed in the receiver 300 for the transmission layer grouping of transmission layers employed in embodiments of the present disclosure. Here, the transmission layers are extracted one group at a time. Thus, in the first stage, the first group is decoded by nulling or canceling the effect of other groups. The output from the decoder 308 is then re-encoded and used to cancel interference to subsequent groups.

An advantage of grouping multiple transmission layers together is that the number of CQIs fed back may be reduced. In one embodiment, the G-CQI is obtained by combining the CQIs for different transmission layers within the group. For instance, exponential averaging with a well-chosen weighting parameter may be used. The optimum weighting parameter typically depends on the modulation-and-coding scheme (MCS) to be used. However, since the receiver does not know the MCS beforehand, it can provide an estimated value of a likely MCS based on the supportable throughput and use the corresponding MCS.

Computation of G-CQI, when group permutation/time-varying pre-coder is used may employ a similar approach. The true post-decoding G-CQI varies from time to time depending on the pre-coder used. The same approach used to combine group CQIs may be used here, except that the combination is done over all transmission layer CQIs at all possible pre-coders.

Techniques to achieve near-optimum throughput with low feedback using transmission layer grouping pre-coder enhancement and enhanced decoders have been presented. These include employing G-SIC decoding wherein the receiver 300 can decode the groups successively. Additionally, G-CQI for grouped antennas is employed.

FIG. 4 illustrates an embodiment of a method 400 of operating a transmitter. The method 400 starts in a step 405 with a transmitter having at least three transmit antennas. Then, in a step 410, at least one group-based channel quality indicator is recovered that is provided by a feedback signal from a receiver. In one embodiment, at least one transmission layer index based on one group-based channel quality indicator is also recovered. Similarly, at least one index of transmission layer grouping based on one group-based channel quality indicator may also be recovered. Each group-based channel quality indicator corresponds to one of a set of transmission layer groupings, and at least one symbol stream is generated in a step 415.

Each symbol stream is multiplexed to at least one transmission layer grouping in a step 420. In one embodiment, the multiplexing provides a three-layer transmission having a transmission layer grouping of one or two groups for three transmit antennas. In another embodiment, the multiplexing provides a four-layer transmission having a transmission layer grouping of one group or two asymmetrical groups for four transmit antennas. Alternately, the multiplexing may the four-layer transmission having a transmission layer grouping of two symmetrical groups for four transmit antennas. For these cases, the multiplexing provides a transmission employing an explicit grouping or a default grouping for a transmission layer grouping of at least two groups.

The transmission layers are coupled to the transmit antennas for the transmission in a step 425. In one embodiment, the coupling provides the transmission employing a time-variant pre-coding matrix in response to the feedback signal from the receiver. In an alternate embodiment, the coupling provides the transmission employing a group permutation pre-coding codebook. Additionally, the coupling may provide the transmission employing a grouping-based codebook.

The transmission may also be provided by employing a pre-coding codebook that is constructed by multiplying at least one base matrix with each permutation matrix from a group permutation pre-coding codebook. Similarly, the transmission may be provided by employing a pre-coding codebook that is constructed by multiplying at least one base matrix with each grouping matrix from a grouping-based codebook. The method 400 ends in a step 430.

FIG. 5 illustrates an embodiment of a method 500 of operating a receiver. The method 500 starts in a step 505. Then, in a step 510, a transmission is received from a transmitter having at least three transmit antennas and capable of a transmission layer grouping. Decoding to separate and demultiplex transmission layers corresponding to the transmission layer grouping is performed in a step 515. At least one group-based channel quality indicator is fed back to the transmitter in a step 520, wherein each group-based channel quality indicator corresponds to one of a set of transmission layer groupings.

In the step 520, the feeding back provides the group-based channel quality indicator based on employing a group successive interference cancellation decoding in the step 515. Additionally, the step 520 provides the group-based channel quality indicator as a combination of individual channel quality indicators respectively corresponding to each transmission layer of the transmission layer grouping. In one embodiment, this combination corresponds to an exponential averaging of the individual channel quality indicators that employs a weighting parameter. The method 500 ends in a step 525.

While the methods disclosed herein have been described and shown with reference to particular steps performed in a particular order, it will be understood that these steps may be combined, subdivided, or reordered to form an equivalent method without departing from the teachings of the present disclosure. Accordingly, unless specifically indicated herein, the order or grouping of the steps is not a limitation of the present disclosure.

Those skilled in the art to which the disclosure relates will appreciate that other and further additions, deletions, substitutions and modifications may be made to the described example embodiments without departing from the disclosure.

What is claimed is:

1. A receiver, comprising:
 a receive portion employing a transmission from a transmitter having at least three transmit antennas and capable of a transmission layer mapping;
 a stream decoder portion configured to separate and demultiplex transmission layers corresponding to the transmission layer mapping; and
 a feedback generator portion configured to provide at least one group-based channel quality indicator that is fed back to the transmitter, wherein each group-based channel quality indicator corresponds to one of a set of transmission layer mappings.

2. The receiver as recited in claim 1 wherein the feedback generator portion provides the group-based channel quality indicator based on employing a group successive interference cancellation decoding.

3. The receiver as recited in claim 1 wherein the feedback generator portion provides the group-based channel quality indicator as a combination of individual channel quality indicators respectively corresponding to each transmission layer of the transmission layer mapping.

4. The receiver as recited in claim 3 wherein the combination corresponds to an exponential averaging of the individual channel quality indicators that employs a weighting parameter.

5. A method of operating a receiver, comprising:
 receiving a transmission from a transmitter having at least three transmit antennas and capable of a transmission layer mapping;
 decoding to separate and demultiplex transmission layers corresponding to the transmission layer mapping; and
 feeding back at least one group-based channel quality indicator to the transmitter, wherein each group-based channel quality indicator corresponds to one of a set of transmission layer mapping.

6. The method as recited in claim 5 wherein the feeding back provides the group-based channel quality indicator based on employing a group successive interference cancellation decoding.

7. The method as recited in claim 5 wherein the feeding back provides the group-based channel quality indicator as a combination of individual channel quality indicators respectively corresponding to each transmission layer of the transmission layer mapping.

8. The method as recited in claim 7 wherein the combination corresponds to an exponential averaging of the individual channel quality indicators that employs a weighting parameter.

9. A receiver, comprising:
 means for employing a transmission from a transmitter having at least three transmit antennas and capable of a transmission layer mapping;
 means configured to separate and demultiplex transmission layers corresponding to the transmission layer mapping; and
 means configured to provide at least one group-based channel quality indicator that is fed back to the transmitter, wherein each group-based channel quality indicator corresponds to one of a set of transmission layer mappings.

10. The receiver as recited in claim 9 wherein the means configured to provide at least one group-based channel quality indicator that is fed back to the transmitter provides the group-based channel quality indicator based on employing a group successive interference cancellation decoding.

11. The receiver as recited in claim 9 wherein the means configured to provide at least one group-based channel quality indicator that is fed back to the transmitter provides the group-based channel quality indicator as a combination of individual channel quality indicators respectively corresponding to each transmission layer of the transmission layer mapping.

12. The receiver as recited in claim 11 wherein the combination corresponds to an exponential averaging of the individual channel quality indicators that employs a weighting parameter.

13. A method of operating a receiver, comprising:
 receiving a transmission layer mapping;
 decoding to separate and demultiplex transmission layers corresponding to the transmission layer mapping; and
 feeding back at least one group-based channel quality indicator to a transmitter transmitting the transmission layer mapping, wherein each group-based channel quality indicator corresponds to one of a set of transmission layer mappings.

14. The method as recited in claim 13 wherein the feeding hack provides the group-based channel quality indicator based on employing a group successive interference cancellation decoding.

15. The method as recited in claim 13 wherein the feeding back provides the group-based channel quality indicator as a combination of individual channel quality indicators respectively corresponding to each transmission layer of the transmission layer mapping.

16. The method as recited in claim 15 wherein the combination corresponds to an exponential averaging of the individual channel quality indicators that employs a weighting parameter.

* * * * *